United States Patent
Kondo et al.

(10) Patent No.: US 9,618,916 B2
(45) Date of Patent: Apr. 11, 2017

(54) DEMAND CONTROL DEVICE

(71) Applicant: DAIKIN INDUSTRIES, LTD., Osaka-shi, Osaka (JP)

(72) Inventors: Tetsuyuki Kondo, Kusatsu (JP); Mizuki Tanaka, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 53 days.

(21) Appl. No.: 14/428,916

(22) PCT Filed: May 15, 2013

(86) PCT No.: PCT/JP2013/063539
§ 371 (c)(1),
(2) Date: Mar. 17, 2015

(87) PCT Pub. No.: WO2014/045635
PCT Pub. Date: Mar. 27, 2014

(65) Prior Publication Data
US 2015/0253752 A1    Sep. 10, 2015

(30) Foreign Application Priority Data
Sep. 20, 2012 (JP) ................. 2012-207103

(51) Int. Cl.
*G05D 3/12* (2006.01)
*G05D 5/00* (2006.01)
(Continued)

(52) U.S. Cl.
CPC .......... *G05B 15/02* (2013.01); *F24F 11/0009* (2013.01); *H02J 3/14* (2013.01);
(Continued)

(58) Field of Classification Search
USPC .................. 700/286, 298; 324/157
See application file for complete search history.

(56) References Cited

U.S. PATENT DOCUMENTS

2009/0195070 A1* 8/2009 Takegami ............ F24F 11/0086
307/31
2010/0324962 A1 12/2010 Nesler et al.
(Continued)

FOREIGN PATENT DOCUMENTS

JP          10-311585 A    11/1998
JP       2007-212038 A     8/2007
(Continued)

OTHER PUBLICATIONS

International Preliminary Report of corresponding PCT Application No. PCT/JP2013/063539 dated Apr. 2, 2015.
(Continued)

*Primary Examiner* — Ziaul Karim
(74) *Attorney, Agent, or Firm* — Global IP Counselors

(57) ABSTRACT

A demand control device performs demand control in which energy consumption of heat source units is suppressed with regard to a heat source system having a plurality of the heat source units with capacities and/or output characteristics that are different. The demand control device includes a receiving section, a collecting section, an energy suppression amount value calculating section, a heat source output determining section, and a driving section. The receiving section receives a demand signal which requests starting of the demand control. The energy suppression amount value calculating section calculates an energy suppression amount value relating to an energy amount suppressed during the demand control. The heat source output determining section determines an output individually with regard to each of the plurality of heat source units based on the energy suppression amount value. The driving section drives each of the plurality of heat source units using the output.

8 Claims, 7 Drawing Sheets

(51) Int. Cl.
  *G05D 9/00* (2006.01)
  *G05B 15/02* (2006.01)
  *F24F 11/00* (2006.01)
  *H02J 3/14* (2006.01)
  *H02J 13/00* (2006.01)

(52) U.S. Cl.
  CPC ...... *H02J 13/0062* (2013.01); *H02J 13/0079* (2013.01); *F24F 2011/0047* (2013.01); *H02J 2003/143* (2013.01); *Y02B 70/3225* (2013.01); *Y02B 70/3266* (2013.01); *Y02B 70/3275* (2013.01); *Y02B 90/2638* (2013.01); *Y02P 80/11* (2015.11); *Y04S 20/222* (2013.01); *Y04S 20/242* (2013.01); *Y04S 20/244* (2013.01); *Y04S 40/124* (2013.01)

(56) References Cited

U.S. PATENT DOCUMENTS

2011/0046792 A1* 2/2011 Imes .................... F24F 11/0086
  700/278
2012/0064923 A1 3/2012 Imes et al.
2012/0083927 A1* 4/2012 Nakamura ........... G05B 13/026
  700/278
2012/0226572 A1* 9/2012 Park .......................... H02J 3/14
  705/26.1

FOREIGN PATENT DOCUMENTS

| JP | 2011-2112 A | | 1/2011 |
| JP | 2011-137611 | * | 7/2011 |
| JP | 2012-145263 | * | 8/2012 |
| JP | 2012-154563 A | | 8/2012 |

OTHER PUBLICATIONS

International Search Report of corresponding PCT Application No. PCT/JP2013/063539 dated Jul. 30, 2013.
European Search Report of corresponding EP Application No. 13 83 8999.4 dated Jan. 31, 2017.

* cited by examiner

TABLE OF LOAD AND COEFFICIENT OF PERFORMANCE

| | | LOAD (STEP EQUIVALENT NUMBER OF COMPRESSOR [%]) | | | | | | | | |
|---|---|---|---|---|---|---|---|---|---|---|
| | | 10 | 20 | 30 | 40 | 50 | | 80 | 90 | 100 |
| HEAT SOURCE UNIT NUMBER | 1 | 1.0 | 2.0 | 3.0 | 4.0 | 4.5 | | 3.0 | 2.0 | 1.5 |
| | 2 | 1.0 | 2.0 | 3.0 | 4.0 | 4.5 | | 3.0 | 2.0 | 1.5 |
| | 3 | 1.0 | 1.5 | 2.0 | 2.5 | 3.0 | | 3.5 | 3.8 | 4.0 |

FIG. 4

| HEAT SOURCE UNIT NUMBER | RATED CAPACITY (HORSE POWER) |
|---|---|
| 1 | 30 |
| 2 | 50 |
| 3 | 50 |

FIG. 5

|  | NUMBER AND LOAD (kW) OF HEAT SOURCE UNITS | | |
|---|---|---|---|
|  | 1 | 2 | 3 |
| TOTAL AMOUNT OF ENERGY CONSUMPTION (kW) 1000 | 300 | 300 | 400 |
| 900 | 300 | 300 | 300 |
| 800 | 300 | 300 | 200 |
| 700 | 300 | 200 | 200 |
| 600 | 200 | 200 | 200 |
| 500 | 200 | 200 | 100 |
| ⋮ | ⋮ | ⋮ | ⋮ |

FIG. 7

DEMAND CONTROL DEVICE

CROSS-REFERENCE TO RELATED APPLICATIONS

This U.S. National stage application claims priority under 35 U.S.C. §119(a) to Japanese Patent Application No. 2012-207103, filed in Japan on Sep. 20, 2012, the entire contents of which are hereby incorporated herein by reference.

TECHNICAL FIELD

The present invention relates to a demand control device.

BACKGROUND ART

In the prior art, demand control, where energy consumption is suppressed for a certain period of time, is performed with regard to a heat source system having a plurality of heat source units. A device which is shown in, for example, Japanese Unexamined Patent Application Publication No. 2007-212038 is known as an example of a demand control device which performs demand control. The heat source system in Patent Literature 1 includes a heat source unit where it is possible to control energy consumption and a heat source unit where it is not possible to control energy consumption. The plurality of the heat source units where it is possible to control energy consumption have the same capacities and load characteristics. The demand control device according to Patent Literature 1 uses a method where energy consumption is suppressed simultaneously by all of the heat source units where it is possible to control energy consumption at a given proportion so as to achieve the requested energy consumption.

SUMMARY

Problems to be Solved by the Invention

Some heat source systems have a plurality of heat source units where the capacities and/or the output characteristics are different. There are cases where responsiveness from starting demand control until energy consumption reaches a target varies for every heat source unit, when a plurality of heat source units have the different capacities and/or output characteristics. As a result, responsiveness over the entirety of the heat source system is also reduced with regard to demand control.

The present invention is carried out in consideration of the points described above and the problem of the present invention is to provide a demand control device which improves responsiveness even in a heat source system which has a plurality of heat source units where the capacities and/or the output characteristics are different.

Solution to Problems

A demand control device according to a first aspect of the present invention, which performs demand control where energy consumption of heat source units is suppressed with regard to a heat source system which has a plurality of heat source units where the capacities and/or the output characteristics are different, is provided with a receiving section, an energy suppression amount value calculating section, a heat source output determining section, and a driving section. The receiving section receives a demand signal which requests starting of the demand control. The energy suppression amount value calculating section calculates an energy suppression amount value which is a value relating to an energy amount which is suppressed during the demand control. The heat source output determining section determines an output individually for each of the plurality of heat source units based on the energy suppression amount value. The driving section drives each of the plurality of heat source units using the individual outputs which are determined by the heat source output determining section.

The demand control device calculates the energy suppression amount value after the demand signal is received, and, based on the energy suppression amount value, the demand control device directly controls only the heat source units to be controlled among the plurality of heat source units where the capacities and/or the output characteristics are different. Accordingly, it is possible for the demand control device to improve responsiveness after the demand signal is received.

A demand control device according to a second aspect of the present invention is the demand control device according to the first aspect of the present invention which is further provided with a load and coefficient of performance memory section. The load and coefficient of performance memory section stores load and coefficient of performance information which is information where the load of each of the plurality of heat source units and the coefficient of performance of each of the plurality of heat source units are associated. The heat source output determining section determines the output individually for each of the plurality heat source units based on the load and coefficient of performance information.

In the demand control device, energy consumption is suppressed such that the load of each of the heat source units is set to the load which shows a good coefficient of performance based on the load and coefficient of performance information in order to achieve the required energy suppression amount value in the demand control of the heat source system which has the plurality of heat source units where the capacities and/or the output characteristics are different. As such, it is possible to control the output of each of the heat source units so that the driving efficiency of the whole heat source units with regard to the energy consumption of the whole heat source units is brought close to the maximum.

Here, "load" is equivalent to energy which is actually consumed by the heat source unit. In a case of an inverter type of heat source unit, a ration of energy which is actually consumed to energy which is consumed at the maximum by the heat source unit is expressed using a step number of a compressor or the like. "Output" is an amount of heat which is actually outputted by the heat source units. The "coefficient of performance (COP)" is represented by cooling capacity (kW) per 1 kW of power consumption. "Energy" is power which is expressed in the unit of watts (W) in a case where the energy is electricity. "Energy Amount" is an amount of power which is expressed in the unit of watt hours (Wh) in a case where the energy is electricity.

A demand control device according to a third aspect of the present invention is the demand control device according to the second aspect of the present invention which is further provided with a rated capacity memory section. The rated capacity memory section stores rated capacity information which is information on the rated capacity of each of the plurality of heat source units. The heat source output determining section determines the output individually for each of the plurality heat source units based on the rated capacity information.

In the demand control device, the number of driving heat source units is increased or decreased and the individual outputs of the heat source units are determined based on the rated capacity information and the load and coefficient of performance information of each of the heat source units in the demand control of the heat source system which has the plurality of heat source units where the capacities and/or the output characteristics are different. As such, it is possible to bring the driving efficiency of the whole heat source units close to the maximum.

A demand control device according to a fourth aspect of the present invention is the demand control device according to the first aspect of the present invention which is further provided with a heat source unit output memory section. The heat source unit output memory section stores heat source unit output information which is information where the total amount of energy consumption of all of heat source units and the output of each of the plurality of heat source units are associated. The heat source output determining section calculates an upper limit value for the total amount of energy consumption of all of the heat source units based on the energy suppression amount value. The heat source output determining section determines the output individually for each of the plurality of heat source units based on the upper limit value for the total amount of energy consumption and the heat source unit output information.

In the demand control device, the heat source output determining section determines the total amount of energy consumption for the entirety of the heat source system based on the energy suppression amount value in the demand control of the heat source system which has the plurality of heat source units where the capacities and/or the output characteristics are different. Next, the heat source output determining section determines the load of each of the heat source units. The loads of the heat source units are determined based on the heat source unit output information, which is stored in the heat source unit output memory section, using the total amount of energy consumption of the entirety of the heat source system. The heat source unit output information includes information on a plurality of total amount of energy consumption over the entirety of the heat source system. The information on the total amount of energy consumption over the entirety of the heat source system includes information on the load with a good coefficient of performance for each of the heat source units. As such, it is possible for the heat source output determining section to quickly determine the load of each of the heat source units with good coefficient of performance. Furthermore, it is possible for the driving section to quickly control the output of each of the heat source units using the determined load of each of the heat source units.

A demand control device according to a fifth aspect of the present invention is the demand control device according to any of the first aspect to the fourth aspect of the present invention, where the driving section stops any of the plurality of heat source units based on the energy suppression amount value.

In the demand control device, it is possible to flexibly control the energy consumption over the entirety of the heat source system in the demand control of the heat source system which has the plurality of heat source units where the capacities and/or the output characteristics are different.

Advantageous Effects of Invention

In the demand control device according to the first aspect, it is possible to achieve an energy amount to be suppressed with good responsiveness after the demand signal is received.

In the demand control device according to the second aspect, it is possible to control the output of each of the heat source units so that the driving efficiency of the whole heat source units is brought close to the maximum while achieving the requested energy suppression amount value.

In the demand control device according to the third aspect, it is possible to control increment and reduction of stages of the heat source units and the output of each of the heat source units so that the driving efficiency of the whole heat source units is brought close to the maximum.

In the demand control device according to the fourth aspect, it is possible to quickly determine and control the output of each of the heat source units so that the driving efficiency with regard to the energy consumption of the entirety of the heat source system is brought close to the maximum.

In the demand control device according to the fifth aspect, it is possible to flexibly control energy consumption of the entirety of the heat source units.

BRIEF DESCRIPTION OF THE DRAWINGS

FIG. 4 is a table of load and coefficients of performance for each heat source unit according to an embodiment of the present invention.

FIG. 5 is a table of unit rated capacity of heat source unit according to an embodiment of the present invention.

FIG. 7 is a table of total amount of energy consumption and number and outputs for heat source units according to modified example A.

DESCRIPTION OF EMBODIMENTS

An energy management system 200 according to an embodiment of the present invention will be described below with reference to the drawings.

(1) Outline Configuration of Entire Energy Management System 200

Figure 1:
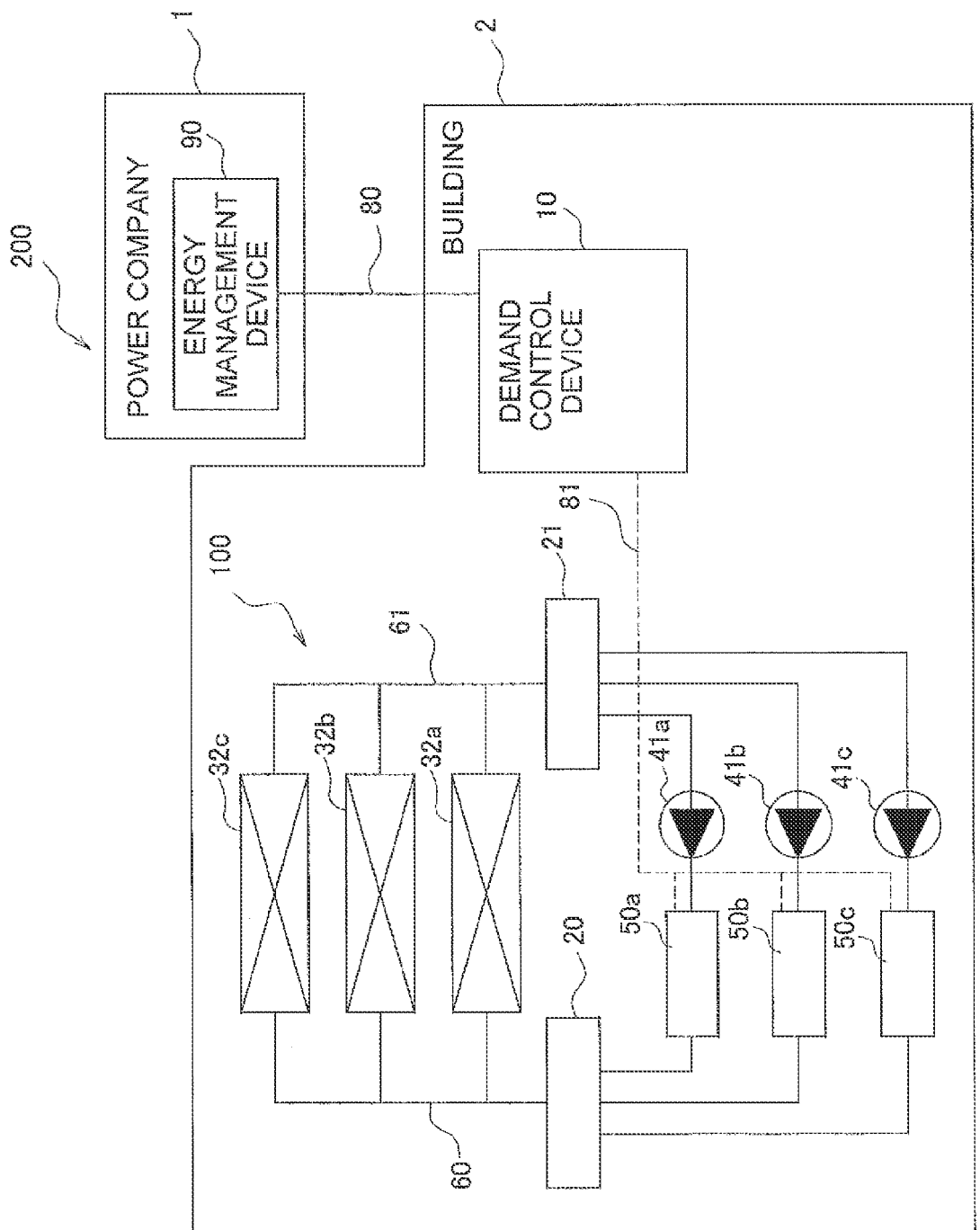
FIG. 1 is a schematic configuration diagram of an energy management system according to an embodiment of the present invention.

The energy management system 200 according to the present embodiment is shown in FIG. 1. The energy management system 200 is a system which manages electric power which is supplied from a power company 1 to a building 2. The building 2 is an office building, a building for rent, a factory, an ordinary home, or the like.

The power company II has an energy management device 90. The building 2 has a demand control device 10 and a heat source system 100. As shown in FIG. 1, the heat source system 100 has heat source units 50*a*, 50*b*, and 50*c*, air conditioners 32*a*, 32*b*, and 32*c*, primary pumps 41*a*, 41*b*, and 41*c*, a first header 20, a second header 21, an upstream side pipe 60, and a downstream side pipe 61. The capacities and/or output characteristics of the plurality of heat source units 50a, 50b, and 50c may be different. The heat source units 50a, 50b, and 50c are, for example, air cooled inverter chillers or air cooled screw chillers.

In the heat source system 100, water, which is cold water or hot water, is sent to the heat source units 50a, 50b, and 50c by the primary pumps 41a, 41b, and 41c. Water which is sent out from the heat source units 50a, 50b, and 50c is aggregated by the first header 20. The water which is aggregated by the first header 20 is sent to the air conditioners 32a, 32b, and 32c through the upstream side pipe 60. Water from the air conditioners 32a, 32b, and 32c is aggregated by the second header 21 through the downstream side pipe 61. Water which is aggregated by the second header 21 is returned to the heat source units 50a, 50b, and 50c by the primary pumps 41a, 41b, and 41c. Water exchanges heat with indoor air in the air conditioners 32a, 32b, and 32c. In FIG. 1, three heat source units and three air conditioners of the building 2 are described, but the number of heat source units and air conditioners is not limited to three.

Here, the first header 20 is a header which aggregates water from each of the heat source units 50a, 50b, and 50c and sends the water to the air conditioners 32a, 32b, and 32c. In addition, the second header 21 is a header which aggregates water which is returned from the air conditioners 32a, 32b, and 32c and sends the water to the primary pumps 41a, 41b, and 41c.

The demand control device 10 receives a demand signal which requests starting of demand control from the energy management device 90. The demand control device 10 controls the energy consumption of each of the heat source units 50a, 50b, and 50c.

The energy management device 90 and the demand control device 10 are connected via a communication network 80 such as the Internet. In addition, the demand control device 10 is connected to the heat source units 50a, 50b, and 50c via a communication network 81 such as a LAN. It is possible for the demand control device 10 to control the energy consumption of the heat source units 50a, 50b, and 50c by transmitting commands to the heat source units 50a, 50b, and 50c via the communication network 81.

The energy management device 90 is a device which is configured from one or more computers. The energy management device 90 manages energy in one or a plurality of buildings. Transmission and reception of various types of information relating to energy need are performed between the energy management device 90 and the demand control device 10.

The power company 1 transmits a request to suppress energy consumption during a demand control period from the energy management device 90 to the demand control device 10 in the building 2 via the communication network 80.

The demand control device 10 receives the request to suppress energy consumption from the energy management device 90. The demand control device 10 performs demand control on each of the heat source units 50a, 50b, and 50c based on the received request to suppress energy consumption.

(2) Configuration of Each Device

The energy management device 90 and the demand control device 10 which are included in the energy management system 200 will be described below.

(2-1) Configuration of Energy Management Device

Figure 2:
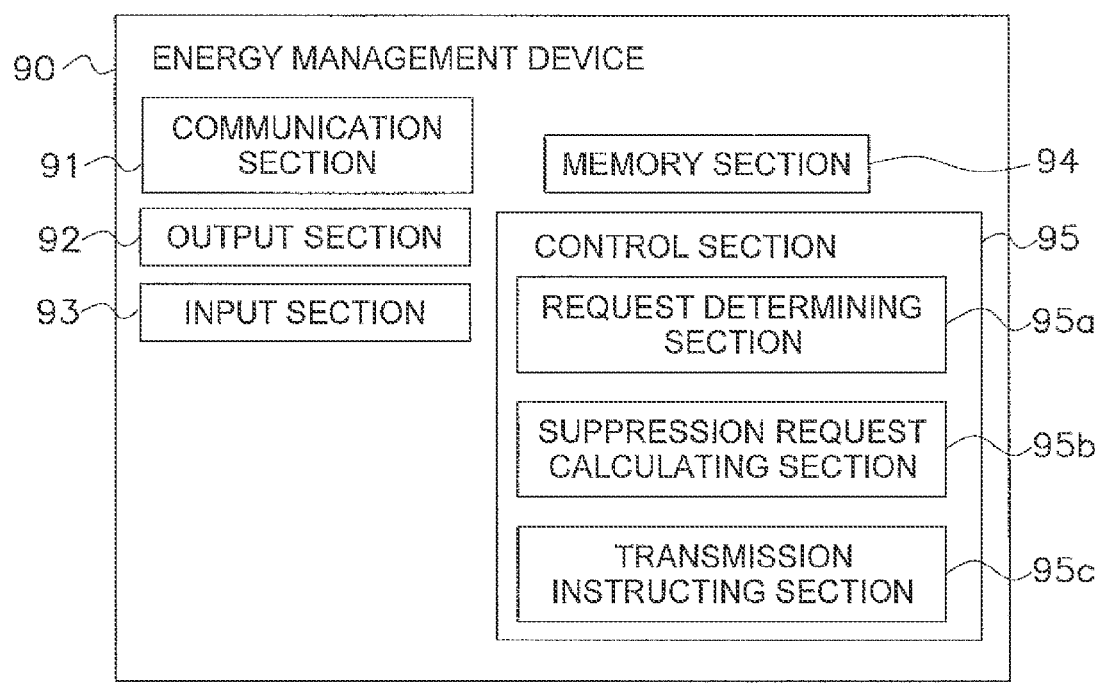
FIG. 2 is a schematic configuration diagram of an energy management device according to an embodiment of the present invention.

A schematic configuration diagram of the energy management device 90 is shown in FIG. 2. The energy management device 90 is provided with a communication section 91, an output section 92, an input section 93, a memory section 94, and a control section 95.

(2-1-1) Communication Section

The communication section 91 is a network interface where it is possible for the energy management device 90 to be connected to the communication network 80.

(2-1-2) Output Section

The output section 92 is mainly configured from a display. A management screen, which shows various types of information stored in the memory section 94 described later, is displayed on the output section 92.

(2-1-3) Input Section

The input section 93 is mainly configured from operation buttons, a keyboard, a mouse, and the like.

(2-1-4) Memory Section

The memory section 94 is mainly configured from a hard disk. The maximum energy consumption amount, the maximum energy suppression amount, and the like of the building 2 which are transmitted to the demand control device 10 are stored in the memory section 94. Here, the maximum energy consumption amount is the total amount of energy consumption in a case where the respective heat source units 50a, 50b, and 50c in the building 2 are driven such that energy consumption is maximized. In addition, the maximum energy suppression amount is the total amount of energy which is suppressible by each of the heat source units 50a, 50b, and 50c in the building 2.

(2-1-5) Control Section

The control section 95 is mainly configured from a CPU, a ROM, and a RAM. As shown in FIG. 2, the control section 95 mainly functions as a request determining section 95a, a suppression request calculating section 95b, and a transmission instructing section 95c by reading out and executing a program stored in the memory section 94 described later.

(2-1-5-1) Request Determining Section

The request determining section 95a performs a prediction of a supply amount and a demand amount for energy over the entirety of the energy management system 200. The request determining section 95a monitors trends in the supply amount and the demand amount and determines to request the suppression of energy to the demand control device 10 in a case where it is determined that there is a possibility that the demand amount may be greater than the supply amount after a predetermined period of time.

(2-1-5-2) Suppression Request Calculating Section

The suppression request calculating section 95b calculates the length of a demand control period where the demand control device 10 performs the demand control and information which relates to an energy amount to be suppressed based on the maximum energy consumption amount and the maximum energy suppression amount stored in the memory section 94.

(2-1-5-3) Transmission Instructing Section

The transmission instructing section 95c instructs the communication section 91 to send the length of the demand control period determined by the suppression request calculating section 95b and information which relates to the energy amount to be suppressed with an energy demand adjustment request to the demand control device 10.

(2-2) Configuration of Demand Control Device

Figure 3:
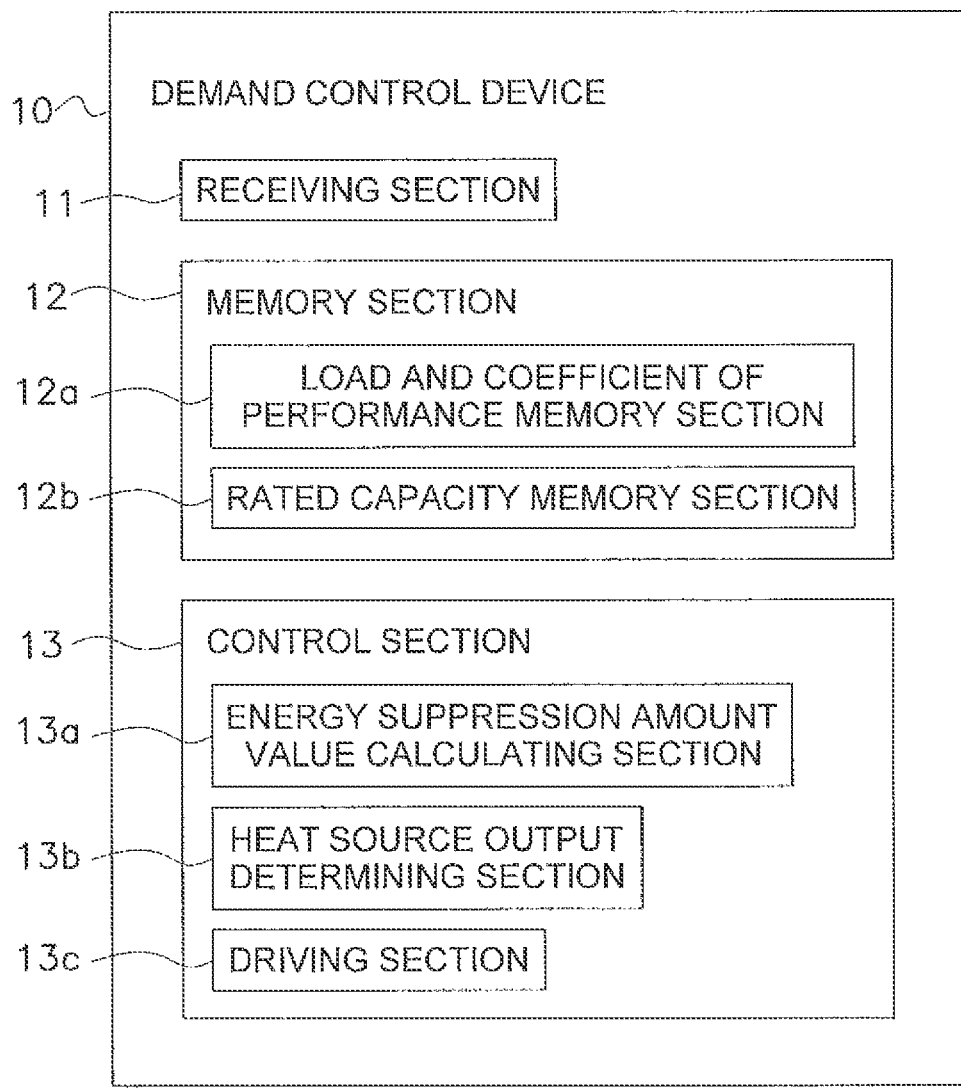
FIG. 3 is a schematic configuration diagram of a demand control device according to an embodiment of the present invention.

FIG. 3 is a schematic configuration diagram of the demand control device 10. The demand control device 10 which is installed in the building 2 will be described below using FIG. 3. The demand control device 110 mainly has a receiving section 11, a memory section 12, and a control section 13.

(2-2-1) Receiving Section

The receiving section 11 is an interface where it is possible for the demand control device 10 to be connected to the communication network 80. In addition, the receiving section 11 receives a demand signal which requests starting of demand control from the energy management device 90. The receiving section 11 receives the length of the demand control period and information which relates to the energy amount to be suppressed in the demand control from the energy management device 90. The receiving section 11 stores the length of the demand control period and the information which relates to the energy amount to be suppressed in the demand control in the memory section 12.

(2-2-2) Memory Section

The memory section 12 is configured from a hard disk or the like and has a load and coefficient of performance memory section 12a and a rated capacity memory section 12b. In addition, the memory section 12 stores an energy suppression amount value which is calculated by an energy suppression amount value calculating section 13a described later. The memory section 12 stores the length of the demand control period and the information which relates to the energy amount to be suppressed in the demand control received by the receiving section 11.

(2-2-2-1) Load and Coefficient of Performance Memory Section

As shown in FIG. 4, the load and coefficient of performance memory section 12a stores, for example, a table of load and coefficient of performance where the loads of each of the heat source units 50a, 50b, and 50c and the coefficient of performance which correspond to the loads are associated. The table of load and coefficient of performance is a table where a load of the heat source units and the coefficient of performance in a case where the heat source units are driven at the loads are associated. The loads of the heat source units are step equivalent numbers of compressors in a case where the heat source units have an inverter type of compressor. In addition, in the table of load and coefficient of performance, the loads of the heat source units and the coefficient of performance at the loads are associated for the number of each of the heat source units.

(2-2-2-2) Rated Capacity Memory Section

As shown in FIG. 5, the rated capacity memory section 12b stores, for example, a table of rated capacity where the rated capacity of each of the plurality of heat source units 50a, 50b, and 50c and the number of each of the plurality of heat source units 50a, 50b, and 50c are associated.

(2-2-3) Control Section

The control section 13 is configured from a CPU, a ROM, a RAM, and the like. The control section 13 mainly functions as an energy suppression amount value calculating section 13a, a heat source output determining section 13b, and a driving section 13c by reading out and executing a program stored in the memory section 12 described above.

Here, when a request for the demand control from the energy management device 90 is received, the control section 13 collects information relating to the energy which is consumed by each of the whole heat source units 50a, 50b, and 50c before preforming the demand control. The control section 13 stores the collected information relating to energy in the memory section 12.

(2-2-3-1) Energy Suppression Amount Value Calculating Section

The energy suppression amount value calculating section 13a determines energy which is to be suppressed based on information which relates to energy which is consumed by all of the heat source units 50a, 50b, and 50c prior to the starting of the demand control and information which relates to an energy amount which is to be suppressed which is stored in the memory section 12 by the receiving section 11. The energy suppression amount value calculating section 13a calculates an energy suppression amount value for a period of time from start to completing of the demand control. The energy suppression amount value is calculated using the length of the demand control period and the energy to be suppressed, described above, which are stored in the memory section 12. The energy suppression amount value calculating section 13a stores the energy suppression amount value in the memory section 12.

(2-2-3-2) Heat Source Output Determining Section

The heat source output determining section 13b determines outputs individually for each of the plurality of heat source units 50a, 50b, and 50c based on the energy suppression amount value which is calculated by the energy suppression amount value calculating section 13a. The details of the determining method will be described later.

(2-2-3-3) Driving Section

The driving section 13c sends a command to each of the heat source units 50a, 50b, and 50c so that the respective outputs of the heat source units 50a, 50b, and 50c become the outputs which are determined by the heat source output determining section 13b. The driving section 13c controls each of the heat source units 50a, 50b, and 50c by communicating with each of the heat source units 50a, 50b, and 50c.

Here, "output" is an amount of heat which is actually outputted by the heat source units. The "coefficient of performance (COP)" is represented by cooling capacity (kW) per 1 kW of power consumption. "Energy" is power output which is expressed in the unit of watts (W) in a case where the energy is electricity. "Energy amount" is an amount of power which is expressed in the unit of watt hours (Wh) in a case where the energy is electricity.

(3) Control Process Performed by Demand Control Device 10

Figure 6:
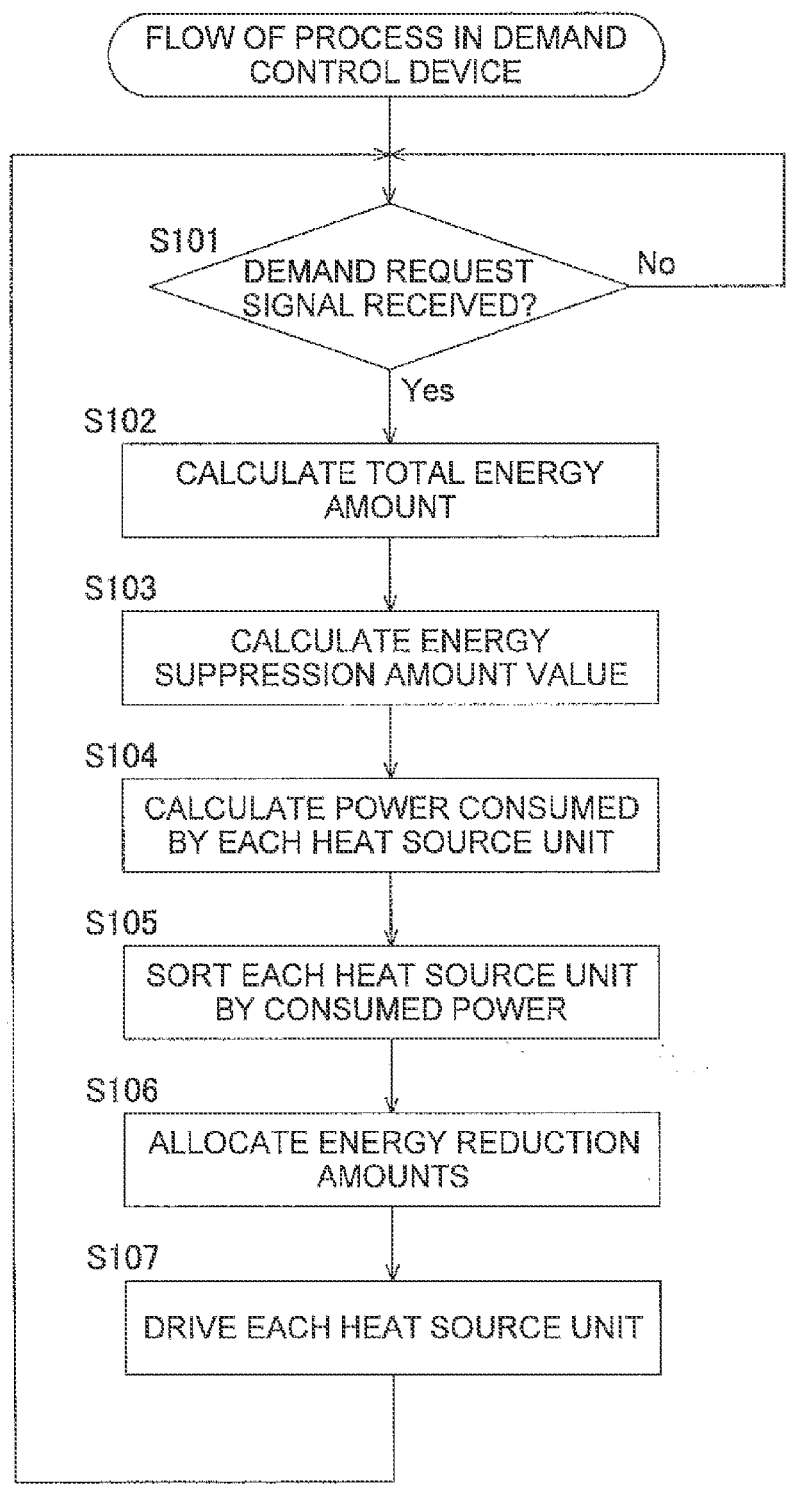
FIG. 6 is a flow chart illustrating the flow of a process in a demand control device according to an embodiment of the present invention.

The flow of the process for demand control in the demand control device 10 will be described below using FIG. 6.

First, in step S101, it is determined whether or not the receiving section 11 receives a request for demand control from the energy management device 90. In a case where it is determined that the receiving section 11 receives the request for demand control, the length of the demand control period and information which relates to the energy amount to be suppressed in the demand control from the energy management device 90 are stored in the memory section 12. Then, the process transitions to step S102. On the other hand, the process returns to step S101 in a case where it is determined that the request for demand control is not received.

In step S102, after the request signal of the demand control is received, the control section 13 collects the energy which is consumed by each of the whole heat source units 50a, 50b, and 50c prior to the starting of the demand control and stores the information in the memory section 12.

In step S103, the energy suppression amount value calculating section 13a calculates the energy suppression amount value. The energy suppression amount value is calculated based on information which relates to energy which is consumed by each of the heat source units 50*a*, 50*b*, and 50*c*, information which relates to the energy amount to be suppressed, and the length of the demand control period which are stored in the memory section 12. The energy suppression amount value calculating section 13*a* stores the calculated energy suppression amount value in the memory section 12.

In step S104, the control section 13 determines the power consumed by each of the heat source units 50*a*, 50*b*, and 50*c* prior to the starting of the demand control using a method which will be described later. The driving section 13*c* perceives the value of the load of each of the heat source units 50*a*, 50*b*, and 50*c*. As such, the control section 13 perceives the value of coefficients of performance of each of the heat source units 50*a*, 50*b*, and 50*c* based on the table of load and coefficient of performance stored in the load and coefficient of performance memory section 12*a*. The control section 13 perceives the rated capacity of each of the heat source units 50*a*, 50*b*, and 50*c* using the table of rated capacity stored in the rated capacity memory section 12*b*. The control section 13 calculates the power consumed by each of the heat source units 50*a*, 50*b*, and 50*c* using equation 1 described below.

Power consumed=Rated capacity/Coefficient of performance (Equation 1)

The power consumed by each of the heat source units 50*a*, 50*b*, and 50*c* prior to the starting of the demand control is stored in the memory section 12.

In step S105, the heat source output determining section 13*b* arrange each of the heat source units 50*a*, 50*b*, and 50*c* in descending order of power consumed based on the power consumed by each of the heat source units which is determined in step S104.

In step S106, the heat source output determining section 13*b* determines the load of each of the heat source units 50*a*, 50*b*, and 50*c* such that the energy reduction amount of all of the heat source units 50*a*, 50*b*, and 50*c* and the energy suppression amount value stored in the memory section 12 are equal. In step S106, the heat source units 50*a*, 50*b*, and 50*c* are arranged in descending order of the power consumed. As such, the heat source output determining section 13*b* allocates the energy amount to be suppressed in the descending order of the power consumed. The heat source output determining section 13*b* allocates the energy amount to be suppressed in a range where the coefficient of performance of each of the heat source units 50*a*, 50*b*, and 50*c* is high based on the table of load and coefficient of performance stored in the load and coefficient of performance memory section 12*a*. The heat source output determining section 13*b* then determines the loads of the heat source units 50*a*, 50*b*, and 50*c* using the energy amounts which are allocated. Any of the heat source units 50*a*, 50*b*, and 50*c* are stopped to reduce whole energy consumed by the heat source units to be stopped in a case where it is determined that it is not possible to achieve the energy suppression amount value when all of the heat source units 50*a*, 50*b*, and 50*c* are driven.

In step S107, the driving section 13*c* drives each of the heat source units 50*a*, 50*b*, and 50*c* such that the load of each of the heat source units 50*a*, 50*b*, and 50*c* becomes the load which is determined by the heat source output determining section 13*b* in step S106.

(4) Characteristics (4-1)

The demand control device 10 according to the present embodiment calculates the energy suppression amount value after the demand signal is received, and, based on the energy suppression amount, directly controls only the heat source units to be controlled among the plurality of heat source units 50*a*, 50*b*, and 50*c* where the capacities and/or the output characteristics are different. As such, it is possible to achieve the energy amount to be suppressed with good responsiveness after the demand signal is received. In the actual demand control, urgency is needed in suppressing the energy consumption. It is possible for the demand control device 110 according to the present embodiment to perform the change of energy consumption in the demand control with good responsiveness. In addition, it is possible to return to the energy consumption prior to the starting of the demand control with good responsiveness after demand control is completed. As such, it is possible to suppress deterioration in user comfort.

(4-2)

In the present embodiment, energy to be suppressed is determined based on the coefficient of performance of each of the heat source units 50*a*, 50*b*, and 50*c* when achieving the requested energy suppression amount value in the demand control of the heat source system 100 which has the plurality of heat source units 50*a*, 50*b*, and 50*c* where the capacities and/or the output characteristics are different. As such, it is possible to drive each of the heat source units 50*a*, 50*b*, and 50*c* with the load where the coefficient of performance is high. Furthermore, it is possible to control the output of each of the heat source units 50*a*, 50*b*, and 50*c* so that the driving efficiency of the whole heat source units 50*a*, 50*b*, and 50*c* is brought close to the maximum.

(4-3)

In the present embodiment, the number of the driving heat source units is increased or decreased so that the driving efficiency of the whole heat source units 50*a*, 50*b*, and 50*c* is brought close to the maximum based on the rated capacity of each of the heat source units 50*a*, 50*b*, and 50*c* in the demand control of the heat source system 100 which has the plurality of heat source units 50*a*, 50*b*, and 50*c* where the capacities and/or the output characteristics are different. In addition, the load of each of the heat source units 50*a*, 50*b*, and 50*c* is controlled. Furthermore, power consumption is calculated from the rated capacity and the coefficient of performance according to the load during driving of each of the heat source units 50*a*, 50*b*, and 50*c*. As such, it is possible to quickly and reliably allocate energy amount to be suppressed during demand control to the heat source units in the descending order of energy consumption.

(4-4)

In the present embodiment, the energy suppression amount value is achieved by adjusting the number of the driving heat source units 50*a*, 50*b*, and 50*c* in the demand control of the heat source system which has the plurality of heat source units 50*a*, 50*b*, and 50*c* where the capacities and/or the output characteristics are different. In detail, the energy suppression amount value is achieved by stopping any of the heat source units out of the plurality of heat source units 50*a*, 50*b*, and 50*c*. As such, it is possible to flexibly control energy consumption over the entirety of the heat source system.

(5) Modified Examples

An embodiment of the present invention is described above based on the drawings, but the detailed configuration is not limited to the embodiment described above and modifications are possible within a range which does not depart from the gist of the present invention. Modified examples of the present embodiment are shown below. A plurality of the modified examples may be appropriately combined.

(5-1) Modified Example A

In the embodiment described above, the heat source output determining section 13b allocates the energy suppression amount value to each of the heat source units 50a, 50b, and 50c each time the demand control device 10 receives the demand control request. The heat source output determining section 13b then determines the load of each of the heat source units 50a, 50b, and 50c.

Here, the memory section of the demand control device may be further provided with a heat source unit output memory section. Furthermore, as shown in FIG. 7, the heat source unit output memory section may store a table of outputs for each of the heat source units which correspond to the total amounts of energy consumption of the heat source system. FIG. 7 shows a case where the heat source system has three heat source units. FIG. 7 shows the total amount of energy consumed by the three heat source units of the heat source system in the vertical column on the left end. In addition, the heat source unit number for each of the heat source units and the loads for each of the heat source units are shown in each of the horizontal rows for each of the total amounts of energy consumption. The loads of each of the heat source units are values where the total of thereof is equal to the total amount of energy consumption in the left column. In addition, the values of the outputs of each of the heat source units are values where the coefficient of performance for the entirety of the heat source system is close to the maximum.

Here, the energy suppression amount value calculating section calculates the energy suppression amount value. The total energy amount, which is consumed by all of the heat source units prior to the starting of the demand control, is calculated by the control section and stored in the memory section. The heat source output determining section calculates an upper limit value of the total amount of energy consumption in the demand control by subtracting the energy suppression amount value from the value of the total energy amount energy. Next, the heat source output determining section detects the column where the upper limit value of the total amount of energy consumption which is calculated is close to the total amount of energy consumption at the left end of FIG. 7. The heat source output determining section determines the values of the loads of the three heat source units in the horizontal row of the detected total amount of energy consumption as the loads of the respective heat source units in demand control. Next, the driving section drives the three heat source units at the loads which realize the outputs which are determined by the heat source output determining section.

Figure 8:
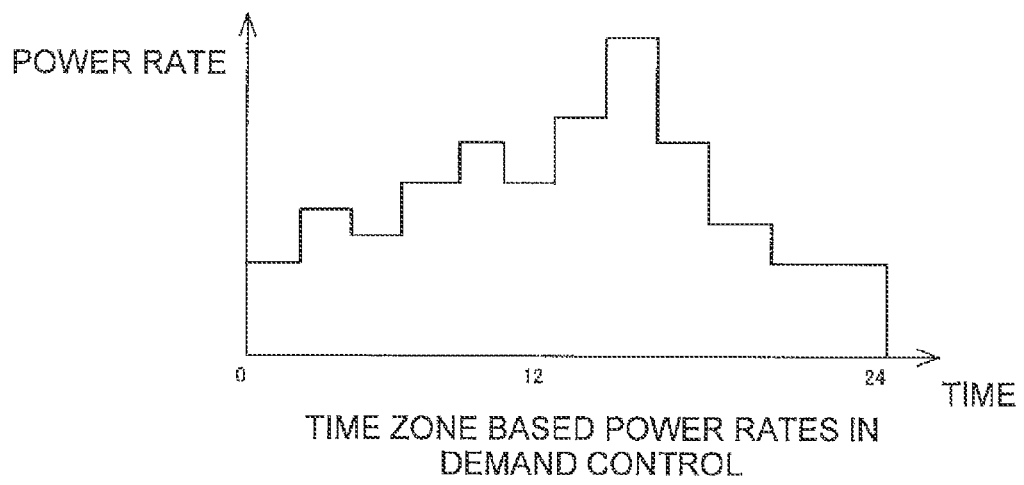
FIG. 8 is a graph representing shifts of time zone based power rates in the demand control according to modified example B.

In the present modified example, in the demand control of the heat source system which has the plurality of heat source units where the capacities and/or the output characteristics are different, it is possible to easily and quickly determine the load of each of the heat source units by searching the table in FIG. 8 when the total amount of energy consumption over the entirety of the heat source system is calculated. Furthermore, it is possible to bring the coefficient of performance over the entirety of the heat source system close to the maximum using the loads of the three heat source units which are determined. Here, in the present modified example, the number of the heat source units is three, but the number of the heat source units is not limited to three.

(5-2) Modified Example B

In the embodiment described above and modified example A, it is controlled that in a condition where the unit price of energy to be consumed is fixed. However, as shown in FIG. 8, there is also a case where the unit price of energy changes according to the time slot. A demand control device in modified example B performs a control where the usage amount of energy is suppressed with good responsiveness when the unit price of energy is high. In addition, the demand control device 10 in modified example B performs a control for pre-cooling, pre-heating, and the like with good responsiveness in a case where the unit price of energy is low. In this manner, it is possible for the demand control device in modified example B to control the heat source system with good responsiveness with regard to variation of the unit price of energy consumption. Accordingly, it is possible to perform a control of energy consumption such that high driving efficiency is achieved without the deterioration of the convenience and the comfort of the user.

INDUSTRIAL APPLICABILITY

It is possible to apply the present invention to a demand control device which performs suppression of energy amounts where predetermined information is transmitted from an energy management device with regard to a system which has a plurality of equipment where the capacities and/or the output characteristics are different.

What is claimed is:
1. A demand control device configured to perform demand control in which energy consumption of heat source units is suppressed with regard to a heat source system, the heat source system having a plurality of the heat source units with at least one of different capacities and different output characteristics, the demand control device comprising:
    a receiving section receiving a demand signal which requests starting of the demand control, a length of a demand control period and information relating to an energy amount to be suppressed being sent from an energy management device arranged at a power company;
    a collecting section collecting information relating to energy consumed by each of the heat source units prior to starting of the demand control after the demand signal is received;
    an energy suppression amount value calculating section calculating an energy suppression amount value, which is a value relating to an energy amount suppressed during the demand control based on the information relating to the energy consumed collected by the collecting section and the information relating to the energy amount to be suppressed;
    a heat source output determining section
        allocating the energy suppression amount value to the heat source units in a descending order of the energy consumed prior to starting of the demand control after the demand signal is received and
        determining an output individually for each of the heat source units based on the energy suppression amount value; and
    a driving section driving each of the heat source units using the output.

2. The demand control device according to claim 1, further comprising:
a load and coefficient of performance memory section storing load and coefficient of performance information, which is information in which load of each of the plurality of heat source units and coefficient of performance of each of the plurality of heat source units are associated,
the heat source output determining section determining the output individually for each of the plurality heat source units based on the load and coefficient of performance information.

3. The demand control device according to claim 2, further comprising:
a rated capacity memory section storing rated capacity information, which is information on rated capacity of each of the plurality of heat source units,
the heat source output determining section determining the output individually for each of the plurality heat source units based on the rated capacity information.

4. The demand control device according to claim 3, wherein the driving section stops any of the plurality of heat source units based on the energy suppression amount value.

5. The demand control device according to claim 2, wherein the driving section stops any of the plurality of heat source units based on the energy suppression amount value.

6. The demand control device according to claim 1, further comprising:
a heat source unit output memory section storing heat source unit output information, which is information in which total amount of energy consumption of all of the heat source units and the output of each of the plurality of heat source units are associated, the heat source output determining section calculating an upper limit value for the total amount of energy consumption of all of the heat source units based on the energy suppression amount value and determining the output individually for each of the plurality of heat source units based on the upper limit value and the heat source unit output information.

7. The demand control device according to claim 4, wherein the driving section stops any of the plurality of heat source units based on the energy suppression amount value.

8. The demand control device according to claim 1, wherein the driving section stops any of the plurality of heat source units based on the energy suppression amount value.

* * * * *